United States Patent Office 2,988,439
Patented June 13, 1961

2,988,439
METHOD OF PREPARING A POTASSIUM POLY-PHOSPHATE GLASS FERTILIZER
Gunter H. Gloss, deceased, late of Mundelein, Ill., by Frithie Gloss, administrator, Downey, Ill., assignor to International Minerals & Chemical Corporation, a corportaion of New York
No Drawing. Filed Apr. 30, 1957, Ser. No. 658,939
8 Claims. (Cl. 71—1)

This invention relates to the manufacture and composition of soluble glass fertilizer materials. More particularly, this invention relates to the manufacture and composition of alkali metal polyphosphate glasses containing compounds of minor elements.

It has been known heretofore that the presence in the soil of trace amounts of minor elements, such as zinc, manganese, iron, copper, boron, and the like, is essential for plant growth. However, minor elements must be present in the soil in certain minimum critical concentrations before improved plant growth can be obtained. When the concentration of the minor elements available to the plants is in excess of a certain level, minor elements may have a toxic effect upon the plants. It is not desirable to add water soluble minor element compounds to the soil as a fertilizer since rapid solubilization of these compounds, when added to the soluble minor element compounds already present in the soil, may create concentrations of minor elements sufficiently great as to be toxic to the plants. On the other hand, when certain water insoluble compounds of the minor elements are added to the soil, these compounds may be rendered more insoluble at a rapid rate by the soil fluids and are thus not sufficiently available to aid in a healthy growth of plants.

It is an object of the present invention to overcome the disadvantages inherent in previously known methods of using minor element compounds as fertilizer ingredients.

It is another object of the present invention to provide minor element compounds in a form which is solubilized in the soil at an optimum rate for healthy plant growth.

Still another object of the present invention is to provide a fertilizer material containing compounds of minor elements in association with an alkali metal polyphosphate glass.

These and other objects of the invention will become apparent upon a more complete understanding of the following detailed description of the invention.

Now it has been discovered that a novel fertilizer component material comprised essentially of an alkali metal polyphosphate and compounds of minor elements may be prepared. In the preparation of the novel fertilizer material, at least one minor element compound and an alkali metal salt are reacted with water and a phosphorus pentoxide-containing material. The reactants are placed in a suitable furnace and heated to fusion at a temperature between about 800 and about 1100° C. for a period of between about 15 minutes and about 3 hours, the longer heating periods being necessary at the lower temperatures. The molten mass produced by fusion is solidified by quenching to form a solid polyphosphate glass material. This material may be comminuted for use as a fertilizer material.

Phosphorus pentoxide-containing materials which may be used in the instant process include phosphoric acid and phosphorus pentoxide. A convenient form of phosphoric acid is an aqueous phosphoric acid solution having a $P_2O_5$ concentration between about 10 and about 68% and preferably between about 20 and about 40% by weight. Phosphoric acid produced by either the wet process or the furnace process may be used as a starting material. Fluorine and iron impurities usually found in wet process phosphoric acid need not be removed from the acid prior to use in the instant process since a major portion of the fluorine may be removed in one of the subsequent heating steps of the novel process. When iron is present in the phosphoric acid, it may be used as a source of iron in preparing the novel fertilizer. Phosphorus pentoxide, which is produced by burning phosphorus in air, may also be used in the instant process.

Minor elements used in the preparation of the novel fertilizer include at least one of the following elements: copper, manganese, zinc, iron, titanium, boron, barium, strontium, lead, molybdenum, nickel, vanadium and cobalt. Minor elements may be supplied in elemental form, as oxides or other compounds of the minor elements, or as ores containing oxides or other compounds of one or more of the minor elements. From an economic standpoint, it is preferred to use ores containing relatively water insoluble compounds of the minor elements since this is generally the cheapest form of the elements that is readily available.

Various compounds of any of the minor elements may be used in the preparation of the novel fertilizer of which the following merely illustrate a convenient form. In addition to the iron which may already be present in the phosphoric acid, iron may be added in the form of a hematite ore containing, for example, about 48% Fe. Manganese may be provided in the form of finely divided pyrolusite. Copper oxide may be added in the form of fine particles recovered as waste material in the ammonia leach process of solubilizing copper ores. Zinc may be supplied in the form of a crude zinc oxide obtained by calcining sphalerite ore. Boron may be added in the form of colemanite and molybdenum may be provided in a form of technical grade molybdenum oxide, $MoO_3$. Cobalt may be provided in the form of technical grade cobalt oxide, and barium may be added in the form of barium sulfate. Strontium may be supplied in the form of celestite ore and lead may be added as a galena ore. Nickel, vanadium and titanium may be added as their stable oxides.

Minor elements are preferably premixed in the desired amounts to form a minor element mix containing the desired proportions of these elements prior to mixing with the other compounds conventionally used in the production of the novel fertilizer. Minor elements or compounds of the minor elements are finely ground in a suitable comminuting apparatus, such as a ball mill, and blended in the desired amounts in a suitable apparatus, such as a pug mill to obtain a substantially homogeneous mixture. It is preferred that at least 90%, and preferably about 95%, of the particles in the minor element mix be less than about 100 mesh. However, coarser or finer particles may be used if desired, provided sufficient but not too great a degree of solubility of the particles in the soil liquids is attained.

The amount of the minor element mix used in the preparation of the novel fertilizer component depends upon the type of plant and type of soil which are to be treated with it. Minor elements may be used in the preparation of the novel fertilizer component in an amount sufficient to provide between about 0.5% and about 25%, and preferably between about 10% and about 20%, of the weight of the novel fertilizer component material. Greater or lesser quantities of the minor element mix may be used, depending upon the plant and soil requirements.

Another material used in the preparation of the novel fertilizer is an alkali metal salt, such as salts of potassium, sodium and lithium, and mixtures thereof. Preferably a potassium salt is used since the potassium present in the salt serves as a plant nutrient. Chlorides of the alkali metals are preferably used but sulfates, nitrates, carbonates, and hydroxides of the alkali metals or mixtures thereof are suitable for use in the preparation of the novel fertilizer. Alkali metal salt may be added to the phosphoric acid in an amount sufficient to provide an alkali metal to phosphorus mole ratio of between about 0.25:1 and about 2.5:1.

One method of controlling the solubility of the novel fertilizer material in the soil liquids is to vary the alkali metal to phosphorus mole ratio. As the mole ratio of alkali metal to phosphorus increases, the solubility increases up to a maximum at about 0.9:1, then decreases to a minimum at about 1.4:1, and thereafter increases more or less continuously. Thus for a relatively soluble material the ratio should be in the range of 0.6:1 to 1.1:1 or greater than 1.7:1. For a relatively insoluble material, the ratio should be well below 0.6:1 or between 1.1:1 and 1.7:1. Optimum ratios are about 0.9:1 and about 2.0:1 for relatively soluble material, and about 0.25:1 and about 1.4:1 for relatively insoluble materials.

In a preferred embodiment of the invention, a mixture of minor element compounds in finely divided form is mixed with an aqueous solution of phosphoric acid in any suitable container for liquids provided with an agitating means. The slurry is heated to a temperature between about 60° C. and the boiling point to increase the rate of solubility of the minor element compounds in the acid solution. Minor element compounds are added to the acid in an amount to provide between about 0.01 and about 1.0 part of minor elements per part of $P_2O_5$ in the acid.

Solid alkali metal salt, such as potassium chloride is added to the solution of phosphoric acid and minor element compounds in an amount sufficient to provide an alkali metal to phosphorus mole ratio of between about 0.25 and about 2.5. The slurry is agitated and heated to a temperature near the boiling point for about 2 hours to dissolve potassium chloride in the acid solution and to evaporate a major portion of the water originally present in the aqueous phosphoric acid solution. The boiling point will vary with the quantities of alkali metal salt and minor element compounds added to the phosphoric acid solution, but the temperature at which the slurry is heated is generally on the order of between about 250° C. and about 400° C. A highly viscous material is produced by this procedure. The viscous material is placed in a suitable furnace, such as a reverberatory furnace, and heated at a temperature between about 800 and about 1100° C. for between about 15 minutes and about 3 hours to fuse the mass. After fusion, the furnace product is quickly quenched by pouring on a cold stone or metal surface to cause solidification of the mass. The solid is then comminuted to a particle size less than about 60 mesh and preferably less than about 80 mesh.

In another embodiment of the invention, the novel fertilizer component material is prepared in a suitable furnace by reacting solid alkali metal salt and solid minor element compounds with gaseous phosphorus pentoxide at a temperature between about 800° C. and about 1100° C. The quantities of reactants discussed above, are used in this embodiment. A suitable furnace for carrying out the reaction is disclosed by R. L. Copson et al., "Development of Processes for Metaphosphate Productions," Industrial and Engineering Chemistry, volume 34, 1942, pages 26 to 32. The furnace is comprised of a horizontal combustion chamber which communicates with a vertical reaction chamber. Communicating with the top of the reaction chamber is a vertical tower packed with coke. Water cooled grates support the coke in the vertical tower. Water and recycled phosphoric acid are introduced at the top and intermediate points of the packing. The solution passes through the packing into the reaction zone.

A phosphorus-air mixture is burned in the combustion zone to form gaseous phosphorus pentoxide. Sufficient air is provided in the mixture to maintain a temperature of between about 1000 and about 1100° C. in tne combustion zone.

An alkali metal salt having a particle size less than about 14 mesh is blown into the reaction zone at one or more ports in the top of the reaction chamber. Solid minor element compounds, having a particle size less than about 100 mesh, may be premixed with the alkali metal salt and introduced into the reaction chamber as a solids mixture. Alternatively, the solid minor element compounds may be introduced into the reaction chamber through one or more separate ports in the top of the chamber.

Phosphorus pentoxide gas passes through the combustion chamber and into the reaction zone where it reacts with solid alkali metal salt, solid minor element compounds, and the phosphoric acid solution from the tower. The temperature in the reaction zone is between about 800 and about 900° C. Unreacted phosphorus pentoxide gas and gases formed in the reaction pass up through the packed tower and are conveyed to a suitable cooler where steam and phosphorus pentoxide are condensed to form an aqueous phosphoric acid solution. This solution is recycled to the packed tower. Uncondensed gases from the cooler may be discarded or further treated as desired.

Partially reacted solids and phosphoric acid solution from the reaction zone drop to the bottom of the combustion zone where the chemical reaction is completed and a melt is formed. The melt is tapped from the furnace at periodic intervals, on the order of about 2 hours, into a water cooled steel pan where it is allowed to solidify. The solidified material is comminuted to a particle size less than about 60 mesh.

The comminuted alkali metal polyphosphate glass particles containing minor elements may be applied directly to the soil as a fertilizer component or may be mixed with a nitrogen containing fertilizer material to produce a complete fertilizer which is then useful for direct application to the soil.

Fertilizer materials containing minor element-phosphate complexes of this type are available to the plants at rates which are beneficial to the healthy growth of the plants. At the same time, the solubility of the minor element compounds in the soil liquids is such that the minor elements will not be solubilized at a high enough rate as to be toxic to the plants.

The utility of the invention is illustrated by the following examples without any intention that the invention be limited thereto. All parts and percentages are by weight unless otherwise specified.

EXAMPLE I

A mixture of minor element compounds was prepared by mixing the following minor element materials in the following amounts:

| Parts | Material | Percent Minor Element in Material |
| --- | --- | --- |
| 134 | Pyrolusite Ore | 42.9 Mn. |
| 21.7 | Copper Oxide | 79.6 Cu. |
| 34.8 | Zinc Oxide | 66.1 Zn. |
| 150.0 | Colemanite | 11.5 B. |
| 2.85 | Molybdenum Oxide | 60.5 Mo. |
| 2.40 | Cobalt Oxide | 71.9 Co. |

The materials in the above-mentioned amounts were comminuted in a ball mill until substantially all of the solids had a particle size passing a 200 mesh screen. About 7.6 parts of the minor element mixture was added to about 600 parts of an aqueous phosphoric acid solution having the following chemical analysis:

Component: Percent
$P_2O_5$ ———————————————————— 26.42
$Fe_2O_3$ ———————————————————— 1.46
$Al_2O_3$ ———————————————————— 0.71

The mixture was agitated and heated at a temperature near the boiling point for about 1 hour. About 46 parts of potassium chloride were added with agitation to the phosphoric acid solution. The mixture was heated to a temperature of about 350° C. for about 2 hours to form a viscous solution. This solution was placed into a silica dish and heated in a furnace to a temperature of about 900° C. for about 30 minutes. The furnace product was quenched by quickly pouring it onto the surface of a cold flat stone. After solidification the material was comminuted to a particle size passing a 60 mesh screen. Chemical analysis of the product was as follows:

| Component: | Percent |
|---|---|
| P | 27.94 |
| K | 20.10 |
| Mn | 0.67 |
| Cu | 0.20 |
| Zn | 0.27 |
| B | 0.20 |
| Mo | 0.02 |
| Co | 0.02 |

The K/P mole ratio of the product was about 0.57:1.

EXAMPLE II

About 7.6 parts of the minor element mixture prepared in Example I was mixed with about 600 parts of aqueous phosphoric acid having the chemical analysis of Example I. The mixture was agitated and heated to a temperature near the boiling point for about 1 hour. About 118.8 parts of potassium chloride were added to the solution with agitation, and heated to a temperature of about 350° C. for about 2 hours to form a viscous solution. The solution was then processed further in the same manner as the similar solution described in Example I. Chemical analysis of the product was as follows:

| Component: | Percent |
|---|---|
| P | 26.56 |
| K | 23.76 |
| Mn | 0.61 |
| Cu | 0.18 |
| Zn | 0.24 |
| B | 0.18 |
| Mo | 0.02 |
| Co | 0.02 |

The K/P mole ratio of the product was about 0.72:1.

EXAMPLE III

The procedure of Example II was repeated using the same quantities of minor element mix and phosphoric acid, but with the exception that 146 parts of potassium chloride were added to the aqueous phosphoric acid solution. Chemical analysis of the product was as follows:

| Component: | Percent |
|---|---|
| P | 25.24 |
| K | 26.55 |
| Mn | 0.57 |
| Cu | 0.17 |
| Zn | 0.23 |
| B | 0.17 |
| Mo | 0.02 |
| Co | 0.02 |

The K/P mole ratio of the product was about 0.84:1.

EXAMPLE IV

The procedure of Example II was repeated using the same quantities of minor element mix, phosphoric acid and potassium chloride, but with the exception that about 7.6 parts of ferrous sulfate were added to the acid with the minor element mix. Chemical analysis of the product was as follows:

| Component: | Percent |
|---|---|
| P | 25.30 |
| P (available) | 23.42 |
| K | 22.63 |
| Mn | 0.73 |
| Cu | 0.22 |
| Zn | 0.29 |
| B | 0.23 |
| Mo | 0.02 |
| Co | 0.02 |
| Fe | 1.59 |

The K/P mole ratio of the product was about 0.72:1.

EXAMPLE V

The procedure of Example II was repeated with the exception that about 76 parts of minor element mix, about 1200 parts of phosphoric acid, and about 92 parts of potassium chloride were used. Chemical analysis of the product was as follows:

| Component: | Percent |
|---|---|
| P | 26.25 |
| P (available) | 12.23 |
| K | 13.72 |
| Mn | 2.62 |
| Cu | 0.79 |
| Zn | 1.05 |
| B | 0.47 |
| Mo | 0.08 |
| Co | 0.08 |
| Fe | 1.13 |

The K/P mole ratio of the product was about 0.72:1.

EXAMPLE VI

The procedure of Example II was repeated with the exceptions that about 76 parts of minor element mix and about 7.6 parts of ferrous sulfate were added to about 1200 parts of phosphoric acid. About 92 parts of potassium chloride were added to the phosphoric acid. Chemical analysis of the product was as follows:

| Component: | Percent |
|---|---|
| P | 27.68 |
| P (available) | 10.84 |
| K | 12.59 |
| Mn | 2.98 |
| Cu | 0.90 |
| Zn | 1.19 |
| B | 0.64 |
| Mo | 0.09 |
| Co | 0.09 |
| Fe | 2.98 |

The K/P mole ratio of the product was about 0.4:1.

EXAMPLE VII

Potted tomato plants were grown from seed in sand treated with an aqueous solution of plant nutrients and the novel fertilizer materials prepared in Examples I, II, IV, and VI. The procedure used to prepare the aqueous nutrient solution was a modification of the procedure described by D. R. Hoagland and D. I. Arnon in Circular No. 347, "The Water-Culture Method of Growing Plants Without Soil," California Agricultural Experiment Station, Berkeley, California. Molar stock solutions of salts listed below are prepared, and mixed with water in the amounts indicated below.

| Stock solution: | Cc. in a liter of nutrient solution |
|---|---|
| M $KH_2PO_4$ | 0.5 |
| M $KNO_3$ | 2.5 |
| M $Ca(NO_3)_2$ | 5.0 |
| M $MgSO_4$ | 2.0 |
| M $NH_4NO_3$ | 1.25 |

A mixture of about 2500 parts of sand and about 0.390 parts of fertilizer component material prepared in Example I was thoroughly mixed and placed in each of 5 flower pots. Three tomato seeds were planted in each pot. During the growth of the plants, the aqueous solution described above was added to the pots as needed to keep the sand moist. After 50 days the plants were harvested, and heated to dryness in an oven at a temperature of about 70° C. for about 24 hours. The weight and composition of the dried plants is presented below in Table I.

EXAMPLE VIII

The procedure of Example VII was repeated with the exception that each pot contained about 2500 parts of sand and about 0.435 part of fertilizer component material prepared in Example II instead of the material of Example I.

EXAMPLE IX

The procedure of Example VII was repeated with the exception that each pot contained about 2500 parts of sand and about 0.340 part of fertilizer component material prepared in Example IV instead of the material prepared in Example I.

EXAMPLE X

The procedure of Example VII was repeated with the exception that each pot contained about 2500 parts of sand and about 0.122 part of the fertilizer component material prepared in Example VI instead of the material prepared in Example I.

EXAMPLE XI

The procedure of Example VII was repeated with the exception that no minor element fertilizer component material was added to the plants and the aqueous plant nutrient solution added to the plants was prepared from molar stock solutions of salts indicated below in the amounts indicated.

| Stock solution: | Cc. in liter of nutrient solution |
|---|---|
| M $KH_2PO_4$ | 1.0 |
| M $KNO_3$ | 5.0 |
| M $Ca(NO_3)_2$ | 5.0 |
| M $MgSO_4$ | 2.0 |

Table I

| Example | Weight of Dry Plants, Grams | Composition, Parts Per Million | | |
|---|---|---|---|---|
| | | B | Fe | Mn |
| VII | 9.16 | 32 | 89 | 43 |
| VIII | 10.12 | 36 | 66 | 71 |
| IX | 10.33 | 32 | 90 | 20 |
| X | 9.67 | 23 | 48 | 21 |
| XI | 2.56 | 23 | 73 | [1] N.D. |

[1] None detected.

Having now thus fully described and illustrated this invention, what is desired to be secured by Letters Patent is:

1. In a method of preparing a potassium polyphosphate glass fertilizer component material, the steps comprising admixing at least one substantially water insoluble compound of a minor element selected from the group consisting of copper, manganese, zinc, iron, titanium, boron, barium, strontium, lead, molybdenum, nickel, vanadium, and cobalt, and mixtures thereof, with an aqueous solution of phosphoric acid, heating the resultant slurry at a temperature between about 60° C. and the boiling point of said acid, whereby said substantially water insoluble minor element compound is dissolved, admixing a potassium salt with the resulting solution, heating said mixture to a temperature between about 250 and about 400° C., whereby said potassium salt is dissolved and a major portion of the water originally present in said solution is evaporated, said potassium salt being added in an amount sufficient to provide a potassium to phosphorus molar ratio of between about 0.25:1 and about 2.5:1, heating the evaporated material to a temperature between about 800 and about 1100° C., quenching the heat-treated material, and recovering a substantially homogeneous potassium polyphosphate containing at least one minor element.

2. The method of claim 1 wherein said phosphoric acid has a $P_2O_5$ concentration within the range of from about 10% to about 68% by weight.

3. The method of claim 1 wherein said substantially water insoluble compounds of minor elements are of a particle size less than about 100 mesh.

4. The method of claim 1 in which the minor element compounds are added in an amount to provide between about 0.5% and about 25% by weight of minor elements in the final product.

5. The method of claim 1 in which the potassium to phosphorus mole ratio is between about 0.25:1 and about 0.6:1, whereby a fertilizer component material is obtained which is relatively insoluble in soil fluids.

6. The method of claim 1 in which the potassium to phosphorus mole ratio is between about 0.6:1 and about 1.1:1, whereby a fertilizer component material is obtained which is relatively soluble in soil fluids.

7. The method of claim 1 in which the potassium to phosphorus mole ratio is between about 1.1:1 and about 1.7:1, whereby a fertilizer component material is obtained which is relatively insoluble in soil fluids.

8. The method of claim 1 in which the potassium to phosphorus mole ratio is between about 1.7:1 and about 2.5:1, whereby a fertilizer component material is obtained which is relatively soluble in soil fluids.

References Cited in the file of this patent

UNITED STATES PATENTS

| 1,654,404 | Blumenberg | Dec. 27, 1927 |
| 2,288,418 | Partridge | June 30, 1942 |
| 2,494,828 | Munter | Jan. 17, 1950 |
| 2,601,395 | Hatch | June 24, 1952 |
| 2,732,290 | Vana et al. | Jan. 24, 1956 |